United States Patent
Rosendahl

(10) Patent No.: US 6,282,816 B1
(45) Date of Patent: Sep. 4, 2001

(54) INSOLE FOR FOOTWEAR

(76) Inventor: Jay W. Rosendahl, 592 Weidmer Ct., Lake Oswego, OR (US) 97034

( * ) Notice: Subject to any disclaimer, the term of this patent is extended or adjusted under 35 U.S.C. 154(b) by 0 days.

(21) Appl. No.: 09/580,465

(22) Filed: May 26, 2000

(51) Int. Cl.$^7$ ................ A43B 13/38; A43B 23/00; A43B 19/00; A61F 5/14
(52) U.S. Cl. ............... 36/44; 36/43; 36/71; 36/180; 36/181; 36/174
(58) Field of Search .................... 36/88, 91, 92, 36/93, 44, 43, 35 R, 36 R, 37, 36 A, 30 R, 28, 31, 144, 145, 148, 149, 154, 166, 173, 174, 175, 176, 178, 180, 181, 182, 71

(56) References Cited

U.S. PATENT DOCUMENTS

| | | |
|---|---|---|
| Re. 32,698 | 6/1988 | Brown . |
| Re. 33,648 | 7/1991 | Brown . |
| D. 418,666 | 1/2000 | Brown . |
| 4,510,700 * | 4/1985 | Brown ........................ 36/44 |
| 4,541,184 | 9/1985 | Leighton . |
| 4,597,196 | 7/1986 | Brown . |
| 4,633,598 | 1/1987 | Moronaga . |
| 4,823,420 * | 4/1989 | Bartneck ...................... 36/43 |
| 4,823,483 | 4/1989 | Chapnick . |
| 4,879,821 | 11/1989 | Graham . |
| 5,068,983 | 12/1991 | Marc . |
| 5,146,698 | 9/1992 | Tilles et al. . |
| 5,255,451 | 10/1993 | Tong . |
| 5,369,896 * | 12/1994 | Frachey et al. ................ 36/29 |
| 5,517,770 | 5/1996 | Martin . |
| 5,787,609 | 8/1998 | Wu . |
| 5,787,610 | 8/1998 | Brooks . |
| 5,918,383 * | 7/1999 | Chee .......................... 36/28 |
| 6,026,599 | 2/2000 | Blackwell . |
| 6,082,023 * | 7/2000 | Dalton ........................ 36/28 |
| B1 4,910,886 | 5/1995 | Sullivan . |

* cited by examiner

Primary Examiner—Paul T. Sewell
Assistant Examiner—Anthony Stashick
(74) Attorney, Agent, or Firm—Robert L. Harrington

(57) ABSTRACT

An insole for a shoe or boot produced by molding together a stiff outer plastic shell, a dual foam inner layer of rubber-like material and a fabric upper layer engaged by the foot. A more dense foam is provided for the inner layer at the arch of the foot. The shell is feathered or thinned toward the fore foot area and extends only to the ball of the foot. The shell is provided with a cut out at the heel and a pad secured to the insole at the cut out cushions the heel at the strike position.

3 Claims, 4 Drawing Sheets

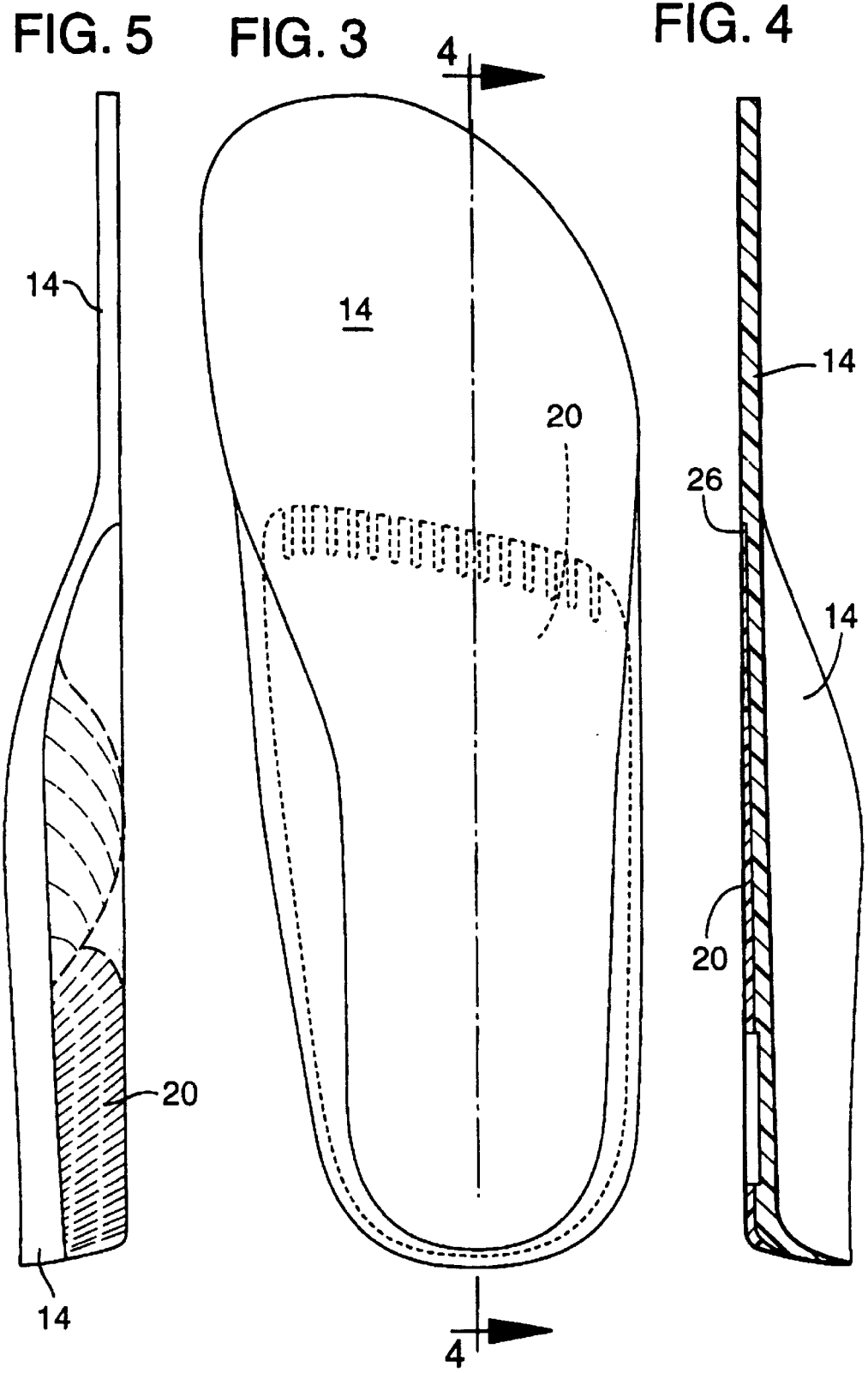

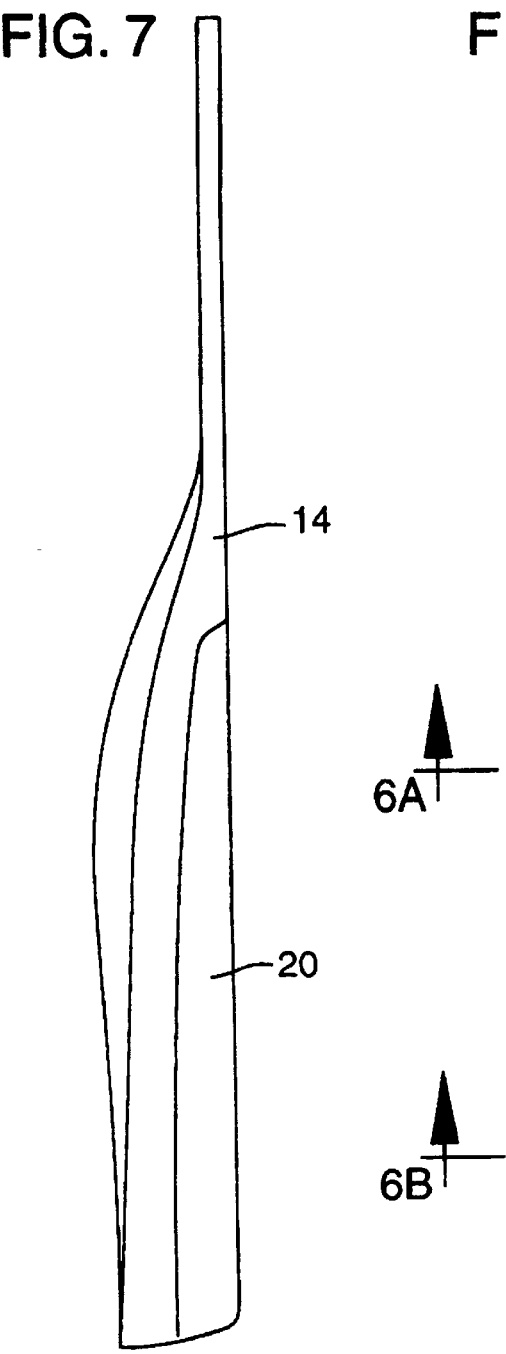
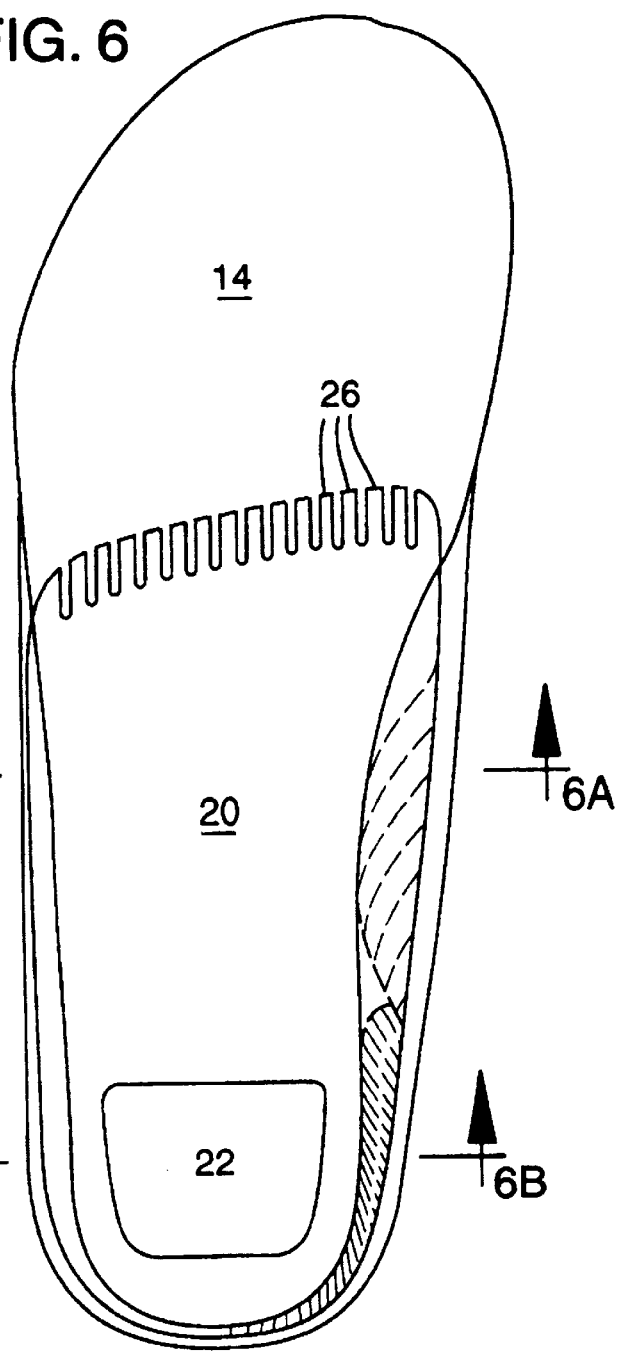
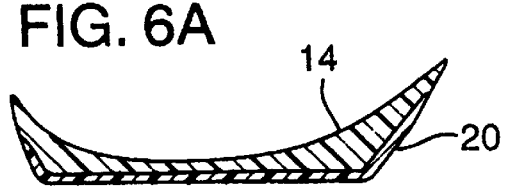

INSOLE FOR FOOTWEAR

FIELD OF THE INVENTION

This invention relates to insoles for various types of footwear to provide added support and comfort and in some circumstances added control.

BACKGROUND OF THE INVENTION

Footwear includes dress shoes and casual shoes, running shoes and walking shoes, ski boots, roller skating boots or shoes, boots secured to snow boards, etc. It is applicable for most any type of shoe or boot and to most persons who wear such shoes or boots. It provides varying benefits including but not limited to support, comfort and control (e.g., for maneuvering a skate board).

When walking or running, the heel of the foot impacts a road or walkway surface and it is desirable that the shoe provide absorption of that impact, e.g., a cushioned support. The foot rolls forward to the ball of the feet as the weight is shifted forward and then to the other foot. A cushion is desired under the ball portion of the foot but not to the same extent as at the heel. During the rolling action of the foot in this weight shifting process, many individuals will favor one side or the other so that the weight is not centered on the bottom of the foot. It is accordingly desirable to provide a center confining support at both sides of the instep portion of the foot but starting at the heel for urging squaring of the foot throughout the weight shifting process. These features are known and attempts have been made to provide some of the structure for accomplishing these objectives in the shoe or boot itself. However, they add considerably to the cost of the shoe or boot. Persons having particular support problems (which is all too often) will seek the help of orthodics, here considered to be a custom built insole for a shoe that specifically is fit to an individual. These orthodics are designed to provide the support as described above with emphasis on certain of the features. Such orthodics are expensive to obtain but can often be transferred from one pair of shoes to another and will accordingly have a life that extends over the life of several pairs of shoes.

Applicant has designed a structure for an insole that can be mass produced and provides the desired support and comfort of customized orthodics for a large percentage of persons having foot support problems and at a far less cost. Further it is discovered that providing such support has beneficial results of better control for persons, e.g., skiing or snow boarding and the like. With the added support, leaning to one side or the other more readily transfers the individual's weight to that side of the shoe and thus to the ski or snow board which is designed to effect turning of the ski or board.

BRIEF DESCRIPTION OF THE INVENTION

In the preferred embodiment of the invention, there are essentially five elements that are integrated to form the insole. There is a fabric top layer, a dual foam sub-layer and a plastic shell under layer. The shell under layer extends from the heel and through the arch of the foot. It wraps around the sides and provides semi-rigid support for the outer and inner sides of the foot. The shell has an opening below the heel of the foot and a rubber cushion fills the opening and is located under the fabric layer and foam sub-layer to cushion the initial impact of the heel when engaging the ground. The dual cushion sub-layer is a semi-soft rubber except at the area of the arch where it is more dense and adds further support to the inside of the foot. The plastic shell is feathered at the forward end to avoid the feel of an edge where the plastic ends and exposes the bottom of the foam sub-layer. Alternatively, a secondary cushioning pad is applied to the top of the insole under the heel and over the fabric layer for added impact absorption.

The above combination of material is generated by first forming the sub-layer of two foam materials pieced together. The fabric is placed over the foam and that combination is placed on the shell in a mold. The molding process bonds the three layers together and the heel pad (or pads) is secured by gluing as a final step.

The invention will be more fully appreciated upon reference to the following detailed description having reference to the accompanying drawings.

DETAILED DESCRIPTION OF THE DRAWINGS

FIG. 3 is a top view of the insole of FIG. 1;

FIG. 4 is a section view through section lines 4—4 of FIG. 3;

FIG. 5 is a medial side view of the insole of FIG. 1;

FIG. 6 is a bottom view of the insole of FIG. 1;

FIGS. 6A and 6B are section views from FIG. 6 as taken on view lines 6a—6a and 6b—6b, respectively;

FIG. 7 is a lateral side view of the insole of FIG. 1; and

DESCRIPTION OF THE PREFERRED EMBODIMENT

Figure 1:
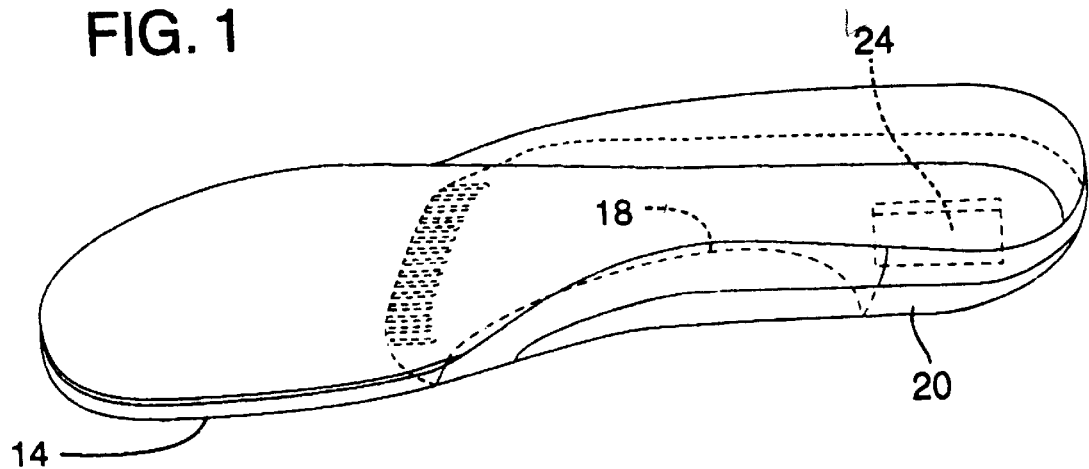
FIG. 1 is a perspective view of an insole in accordance with the present invention.

FIG. 1 illustrates an insole 10 adapted for insertion into a foot wear which includes any form of foot wear including a shoe, a boot, a ski boot, a roller blade boot, etc.

Figure 2:
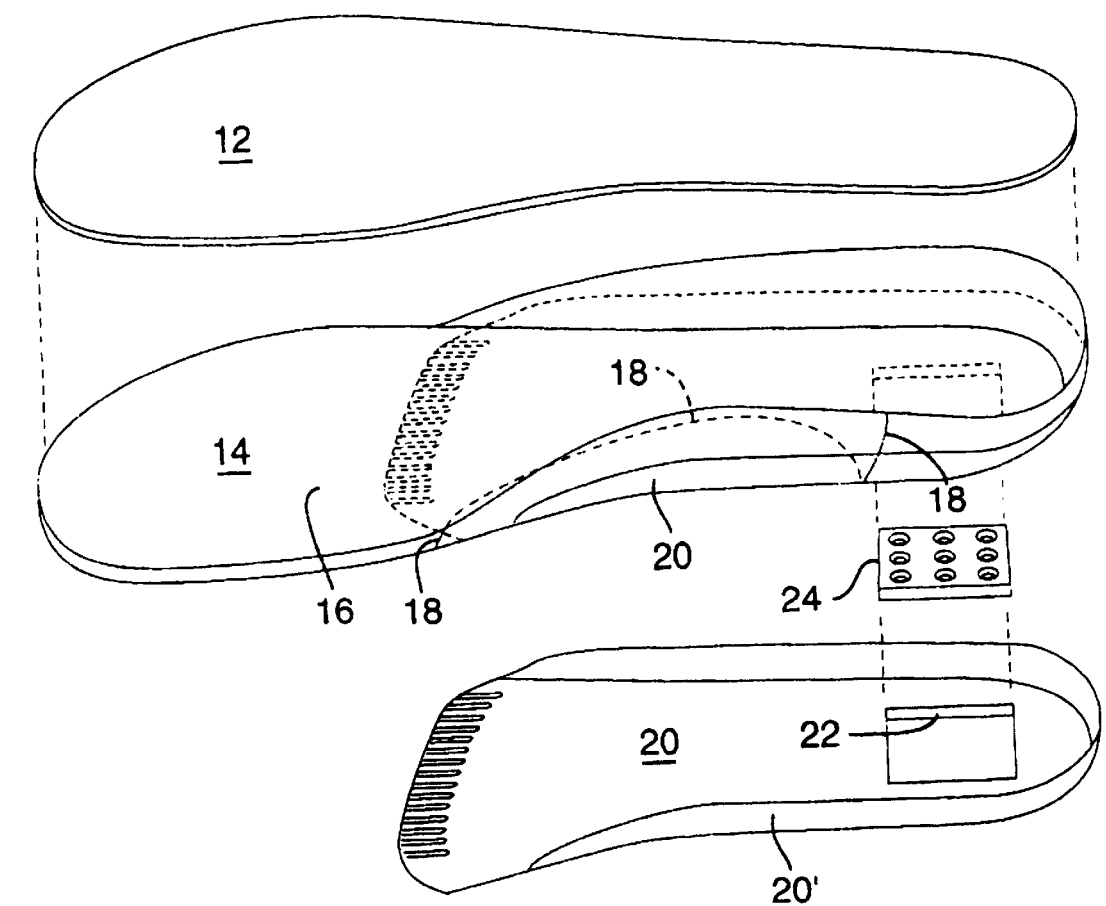
FIG. 2 is an exploded view illustrating the components that make up the insole of FIG. 1.

FIG. 2 illustrates the components of the insole. Item 12 is a fabric top layer that is cut to the size of the shoe or boot and is about 0.5 mm thick. Under the fabric top layer is a composite foam sub-layer 14 (about 3–4 mm thick) that has a main part 16 of semi-soft rubber and an arch part of dense/firm rubber, an outline of which is indicated by reference 18. The composite sub-layer 14 is a polymer type material such as ethyl vinyl acetate. The two parts 16 and 18 are molded into one piece that makes up foam sub-layer 14.

Item 20 is a rigid plastic outer shell (e.g., made of nylon and produced by the process of injection molding) that extends to the ball of the foot and is 1–2 mm thick, the thickest part at the arch area and underlying foam layer 18. The shell 20 is cup-shaped and forms a side wall 20' surrounding the heel and sides of the insole as illustrated in FIG. 1. Cut out 22 is provided under the heel in the shell 20 and a cushioning pad 24 is glued to the inner layer 14 and protruded through cutout 22. The pad 24 is a rubber jell cushion which may be made of sorbothane, approximately 3 mm thick.

The composite insole 10 is further illustrated in drawings FIGS. 3–7 except the fabric top layer is omitted. From these views and particularly noting cross section views 6A and 6B, the formation of the instep or arch support can be observed. The more dense rubber of layer 14 in combination with the rigid shell 20 (which has its thickest and stiffest section at the instep) securely supports the instep of a person's foot. The thickness of the inner foam layer 14 is about 4 mm in thickness and is flexible and accordingly allows flexing of the insole from the ball of the foot forward, i.e., forward of the front end edge 26 of shell 20 (see FIG. 4). The shell 20 has a thickness of about 1.5 mm just rearward of the inside but is feathered or thinned to a thickness of about 0.5 mm toward the front edge 26 as will be noted in FIG. 4. The feathering is further made evident in FIG. 6 with the shell terminating at its end edge 26 in flex fingers or tabs as shown.

Figure 8:
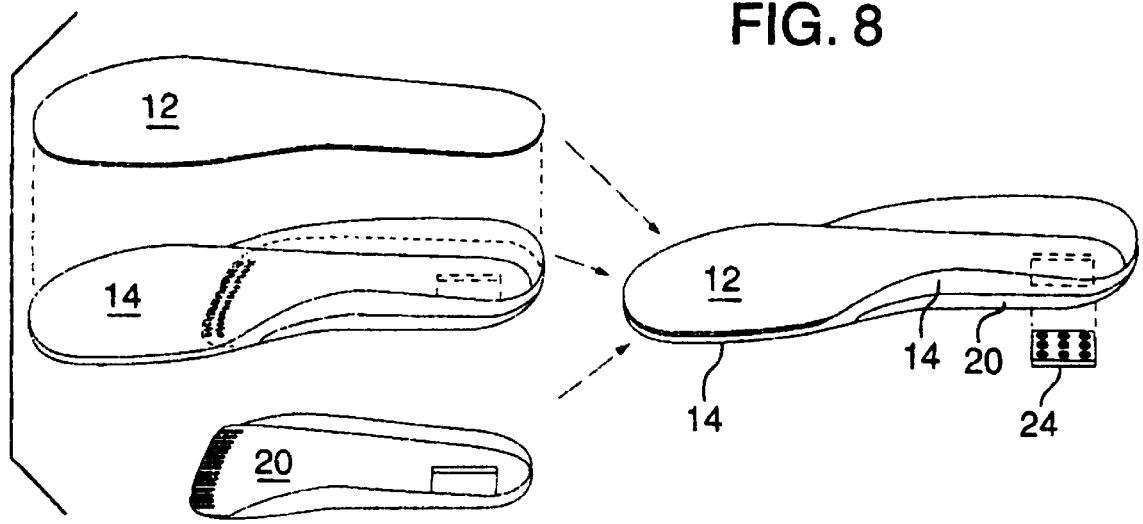
FIG. 8 is a schematic illustration of the process used for producing the insole of FIG. 1.

FIG. 8 represents the process of molding the components of FIG. 2 into an integral insole. First the two foam rubber segments making up layer 14 are pieced together. Then the fabric layer and shell are fitted over and under the combined foam segments 14 and the three layers are molded to form the integral insole as indicated by the arrows. Following this molding process, the heel pad 24 is bonded to the inner layer 14 through the opening 22 in the shell to form the final product 10.

It will be observed from FIGS. 6A and 6B that the foam segments are molded together and become integral with one another although the density is different, the difference being indicated by the reference line 18 in FIG. 2. From the above description, it will be apparent that the insole of the invention provides varying support properties. The arch or instep of the foot is provided with the greatest stiffness, first as a result of the shell which itself has the greatest thickness at the arch. The inner layer 14 has its stiffest configuration, also at the instep. Progressing from the instep toward the ball of the foot (whereat the plastic shell terminates) the insole becomes more pliable and less stiff and at the ball of the foot following termination of the shell the insole is pliable i.e., at the fore foot portion. The multi-level graduated blending of stiffness and softness is believed unique to the present invention.

Persons skilled in the art will be able to conceive of modifications and/or improvements over what is here considered and described as the preferred embodiment. The invention encompasses such modifications and improvements as determined by the scope of the appended claims.

The invention claimed is:

1. An insole for a foot wear having a foot bed with heel, arch and ball portions comprising:

a combination of sandwiched layers bonded together as a unit including a flexible fabric top layer, a flexible dual foam sub-layer and a semi-rigid plastic shell under layer, said fabric top layer configured to the shape of the foot bed of the foot wear and said dual foam sub-layer configured and sized to the shape of the fabric top layer, and said plastic shell configured to fit the shape of the heel and extending forwardly from the heel past the arch portion and a leading end of the shell feathered to form a progressively more flexible extreme edge end for avoiding a noticeable edge of conversion between the primarily non-flexible shell support and flexible non-shell support portions, the heel of the shell having a portion removed at a position of heel impact to define an opening, and a rubber pad secured to the bottom of the sub-layer at said opening, said shell having upwardly turned semi-rigid side edges and said dual foam sub-layer having a combination of foam densities, the foam provided in the arch portion being more dense than the foam at the remaining portion of the sub-layer.

2. An insole as defined in claim 1 wherein a second heel pad is secured at the heel impact position at the top side of the fabric.

3. An insole as defined in claim 1 wherein the insole provides multiple levels of stiffness, the outer shell and the more dense foam at the arch portion providing greatest stiffness and support, the area of less dense foam and supported by the shell providing a second level of stiffness, the feathered portion of the shell and the less dense foam providing a third level of stiffness and the less dense foam without the shell providing a fourth level of stiffness.

* * * * *